United States Patent
Brady

(10) Patent No.: US 6,359,978 B1
(45) Date of Patent: *Mar. 19, 2002

(54) SERVICE BUREAU CALLER ID COLLECTION WITH ISDN BRI

(75) Inventor: Patrick K. Brady, Wheaton, IL (US)

(73) Assignee: Apropros Technology, Oakbrook Terrace, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/337,495

(22) Filed: Jun. 22, 1999

Related U.S. Application Data

(63) Continuation of application No. 08/912,859, filed on Aug. 18, 1997, now Pat. No. 5,937,049, which is a continuation of application No. 08/581,101, filed on Dec. 29, 1995, now abandoned.

(51) Int. Cl.[7] .................................................. H04M 3/42
(52) U.S. Cl. .............................. 379/211.02; 379/142.06
(58) Field of Search .................................. 379/201, 210, 379/211, 212, 142, 127, 164, 111, 112.01, 142.06, 201.01, 207.15, 210.01, 211.01, 211.02, 212.01

(56) References Cited

U.S. PATENT DOCUMENTS

| | | | | |
|---|---|---|---|---|
| 4,436,962 A | * | 3/1984 | Davis et al. | ............... 379/201 |
| 4,476,349 A | | 10/1984 | Cottrell et al. | |
| 4,723,273 A | * | 2/1988 | Diesel et al. | ............... 379/211 |
| 4,763,353 A | | 8/1988 | Canale et al. | |
| 4,837,807 A | | 6/1989 | Szeto et al. | |
| 4,907,259 A | | 3/1990 | Frech | |
| 4,926,462 A | | 5/1990 | Ladd et al. | |
| 5,023,868 A | | 6/1991 | Davidson et al. | |
| 5,029,196 A | * | 7/1991 | Morganstein | ............ 379/88.23 |
| 5,062,103 A | | 10/1991 | Davidson et al. | |
| 5,099,509 A | | 3/1992 | Morganstein et al. | |
| 5,159,626 A | | 10/1992 | Baum et al. | |
| 5,168,515 A | | 12/1992 | Gechter et al. | |
| 5,267,307 A | * | 11/1993 | Izumi et al. | ............... 379/354 |
| 5,271,058 A | | 12/1993 | Andrews et al. | |
| 5,274,700 A | | 12/1993 | Gechter et al. | |
| 5,309,028 A | * | 5/1994 | Brown et al. | ............... 379/201 |
| 5,408,528 A | * | 4/1995 | Carlson et al. | ............ 379/211 |
| 5,448,627 A | * | 9/1995 | Ueno et al. | ................... 379/67 |
| 5,557,668 A | * | 9/1996 | Brady | ........................ 379/212 |

\* cited by examiner

*Primary Examiner*—Scott L. Weaver
(74) *Attorney, Agent, or Firm*—Shaw Pittman LLP

(57) ABSTRACT

A system for processing telephone calls incorporates a service bureau. The service bureau provides efficient access to caller identification data. The service bureau extracts the caller identification data from the ISDN Basic Rate Interface. Using the caller identification data, the service bureau tracks customer information and other marketing information. To perform its tracking function, the service bureau maintains and updates a database containing the customer information and other marketing information. The system is particularly useful for providing access to caller identification data to businesses that use telephone switching devices for telephone call routing.

6 Claims, 6 Drawing Sheets

SERVICE BUREAU CALLER ID COLLECTION WITH ISDN BRI

The present application is a continuation of U.S. patent application, Ser. No. 08/912,859, filed Aug. 18, 1997 (now U.S. Pat. No. 5,937,409), which is a continuation of U.S. patent application Ser. No. 08/581,101, filed Dec. 29, 1995 (abandoned).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

A microfiche appendix having one (1) microfiche with thirty-two (32) frames is included in the present application.

This invention relates to the use of ISDN Basic Rate Interface (BRI) technology by businesses. In particular, this invention relates to the use of Caller ID technology to track customer information and other marketing information.

BACKGROUND

The technology of Caller ID is potentially important to businesses because it provides important marketing information about telephone customers. However, telecommunications technology at the customer premises is generally not equipped to receive Caller ID. While single-line solutions to capturing Caller ID are plentiful, corporations and all but the smallest businesses are not able to benefit from single-line devices. In practice, most businesses own some sort of telephone switch on premises. This presents a problem because Caller ID is not received and passed along with calls in these switches. While this problem could be overcome with a new switch built to such purpose, this type of switch would have to be purchased as a replacement for an existing switch, which in all other respects is a perfectly useful and operational device.

Furthermore, Caller ID, in and of itself, is not very useful to a business. The value of a caller's phone number to a business accrues only when data about the owner of the number is known.

Data indexed by phone number is available from a variety of sources. Phone indexed data increases in accuracy (and thus value) as multiple data sources are searched. Professional data source companies sell information based on volume discount. Access to their databases requires on-line links and special software. Programming to each data company's interface is also a requirement. The equipment upgrades, data procurement, linking, and programming are too expensive to be implemented by most small to medium businesses.

DISCLOSURE OF THE INVENTION

The collection of Caller ID data, matching of Caller ID data to databases, generation of reports and statistics based on the data is best performed in a service bureau. The invention below describes such a service bureau from ISDN Basic Rate Interface technology. The advantages of this method are numerous: 1) Caller ID is a basic service of ISDN BRI; 2) ISDN BRI is widely available; 3) ISDN BRI is tariffed for sale; 4) ISDN BRI interface devices are commercially available; 5) calls delivered via ISDN BRI can be transferred to any destination telephone number; 6) ISDN BRI transfers are performed in under one ring cycle. The last two of these advantages are critical for building a service bureau from any telecommunications technology.

The embodiment described comprises ISDN BRI lines from a central office, a personal computer, and ISDN BRI interface device. Implicit in the descriptions is the use of a multitasking operating system. The embodiment is described in terms of processes and messages but there is no reason why a single tasking system with a monolithic program design, or other program and operating system design methods could not accomplish the same result.

Figure 1:
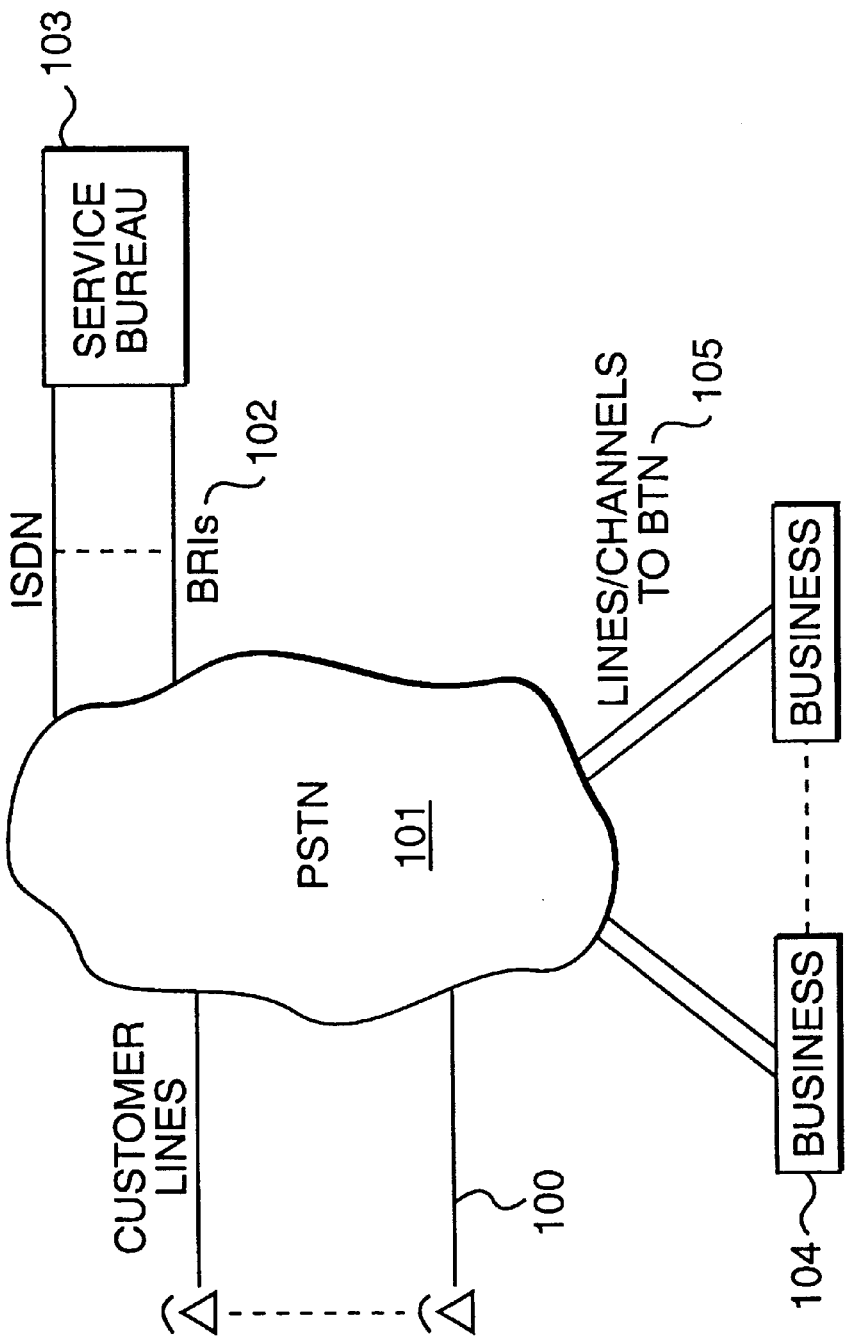
FIG. 1 is a block diagram of the hardware associated with the use of the present invention.
Figure 2:
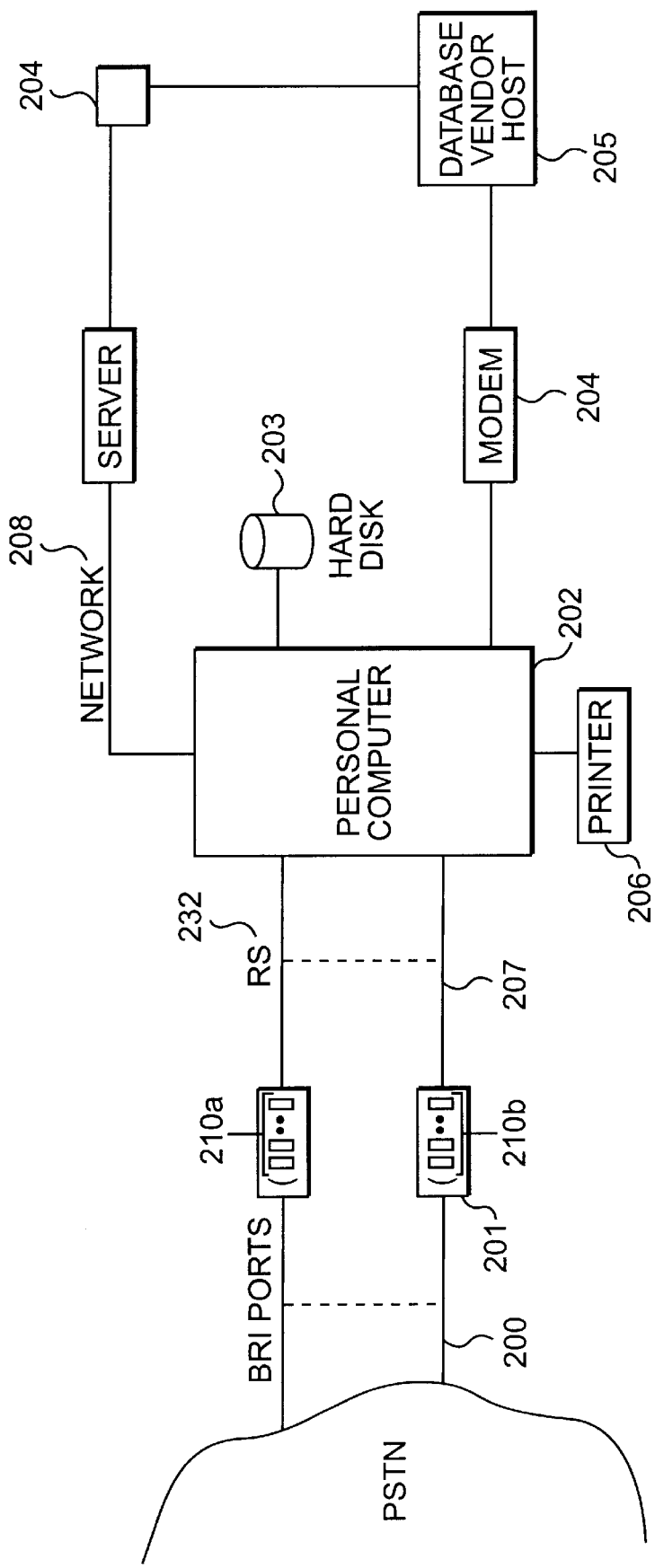
FIG. 2 is a block diagram of a service bureau used in conjunction with the present invention.

Referring to FIG. 1, a Service Bureau 103 is designed using ISDN BRI ports (102) from a public telephone network 101. Referring to FIG. 2, these ports are connected to ISDN BRI devices such as ISDN BRI ISA cards for the IBM PC or AT&T 8510 or AT&T 7506 phones (201) with RS232 device control adapters (207). Software control and monitoring of the messaging from the ISDN protocol is required for access to the Caller ID and destination directory number information.

Referring to FIG. 1 and FIG. 2, in one embodiment of the invention, Customers (100) call a directory number advertised by a Business (104). The system includes lines/channels 105 to business 104. The telephone number resides on an ISDN BRI port (201) of the Service Bureau (103). Calls coming into the Service Bureau result in messages sent from the ISDN Phone (201) having a plurality of buttons, for example buttons 210a and 210b, through an RS232 cable (207) to a personal computer (202). The PC 202 can include a printer 206 and includes a hard disk 203. The system includes a modem 204, a database vendor host 205, a network 208 and a server as shown in FIG. 2. The ISDN phone acts to interpret ISDN lower layer protocols, such as Q.931, into an extended "Hayes" protocol. This translation is not necessary for the operation of the invention. Direct control of the lower ISDN protocols could yield the same result.

ISDN BRI devices contain "button" definitions. These are also called Call Appearances. Each button on the phone may have a directory number associated with it. This is the button which alerts on the phone when an incoming call is presented. These buttons can be arranged into groups as small as one per directory number cut may include multiple buttons assigned to the same directory number. The buttons may also have inbound only or outbound only assignments. Multiple button groupings are useful for handling higher traffic directory numbers since each button can hold a ringing call.

Figure 3:
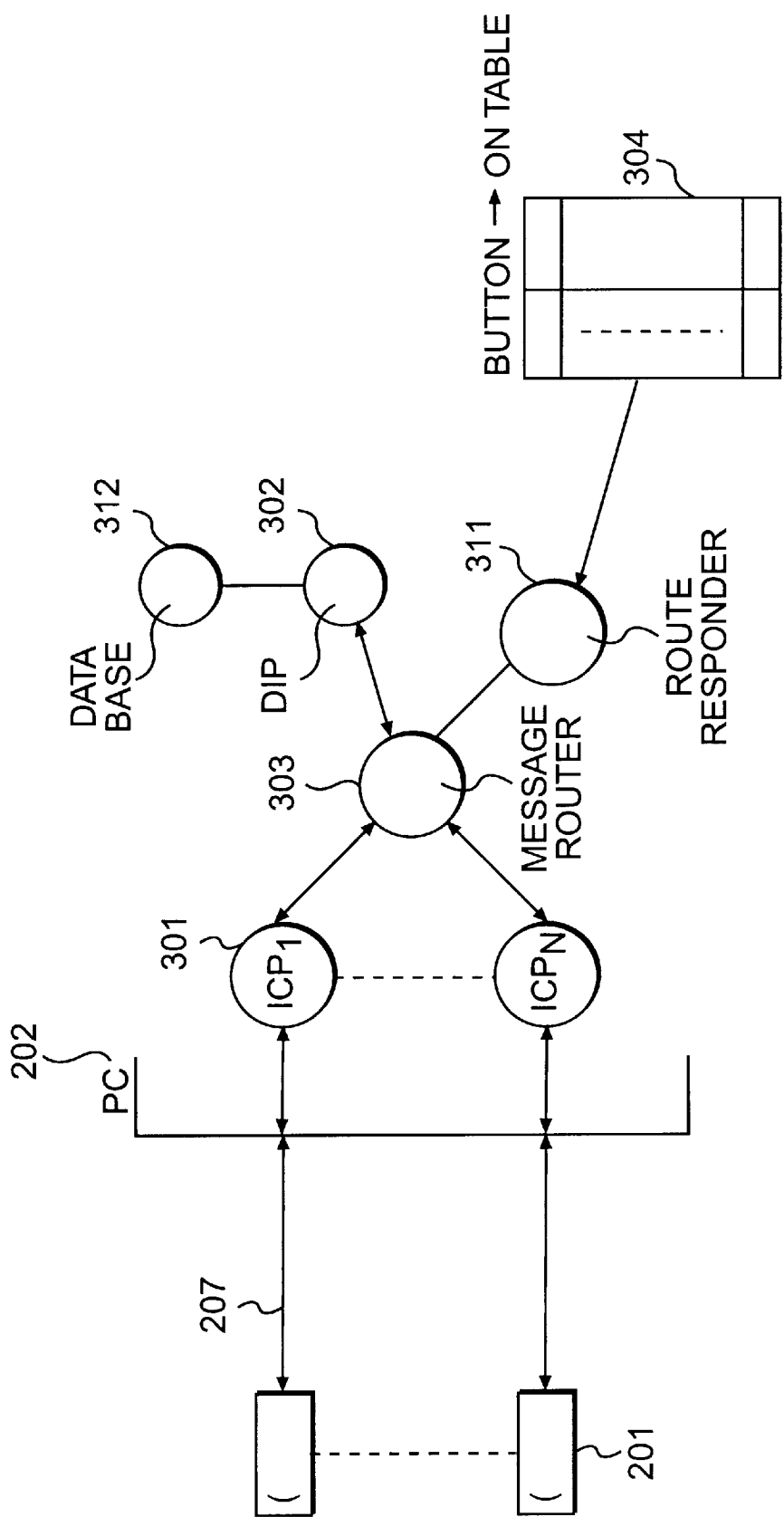
FIG. 3 is a block diagram illustrating the processes used in the personal computer within the service bureau.

Referring to FIG. 3, ISDN Control Processes (301) in the PC (202) read Caller ID and the button number of the incoming call as delivered in the message stream from the ISDN Phone. The ICP (301) stores the Caller ID information in a database for each customer (as determined by button mapping).

The ICP has a table (304) relating button number to destination directory number for the customer. An incoming call is answered, its button number and Caller ID read and stored; the destination directory number looked up; and the call transferred to the destination directory number. In this way one Directory Number Information Service (DNIS) offered for charge by carriers such as MCI can be simulated. This is a significant feature of the invention since this feature alone has great economic value. DNIS typically requires expensive T1 and PBX customer premise equipment.

A number of factors may be brought to bear on the call distribution. Time-of-day, source directory number, related database information for the call, and other information may all play a part in the destination of the call. Referring to FIGS. 2 and 3, this may be stored information looked up at the time of the call or real-time accessed information found from local or remote databases or Hosts (205). This information is available through Responder Processes (311).

In another embodiment of the invention, the switching system provides the call forwarding on no answer feature (CFNA). The Service Bureau takes advantage of this feature by monitoring the button and Caller ID of incoming calls. Where the CFNA is available, calls need not be answered to get to their destinations. This feature is not always available across all directory number assignments on a BRI. Implementation of voice features varies from switch manufacturer.

Where CFNA is not available the call must be answered and transferred to its final destination. To do this a single call appearance (button) on the phone is reserved for outbound dialing and transfer. Calls coming into the phone are currently queued by the ICP software (included in the appendix) and transferred one at a time. A higher performance embodiment of this invention could provide multiple call appearances for multiple simultaneous transfers on a phone. No queuing would be required if each incoming directory number had an associated button for dialing outbound. There are cost trade-offs associated with this implementation. The cost per customer goes up since the average number of buttons on an ISDN phone doubles. The throughput increases, however, since there is no bottleneck for transfers through a single call appearance.

Figure 4:
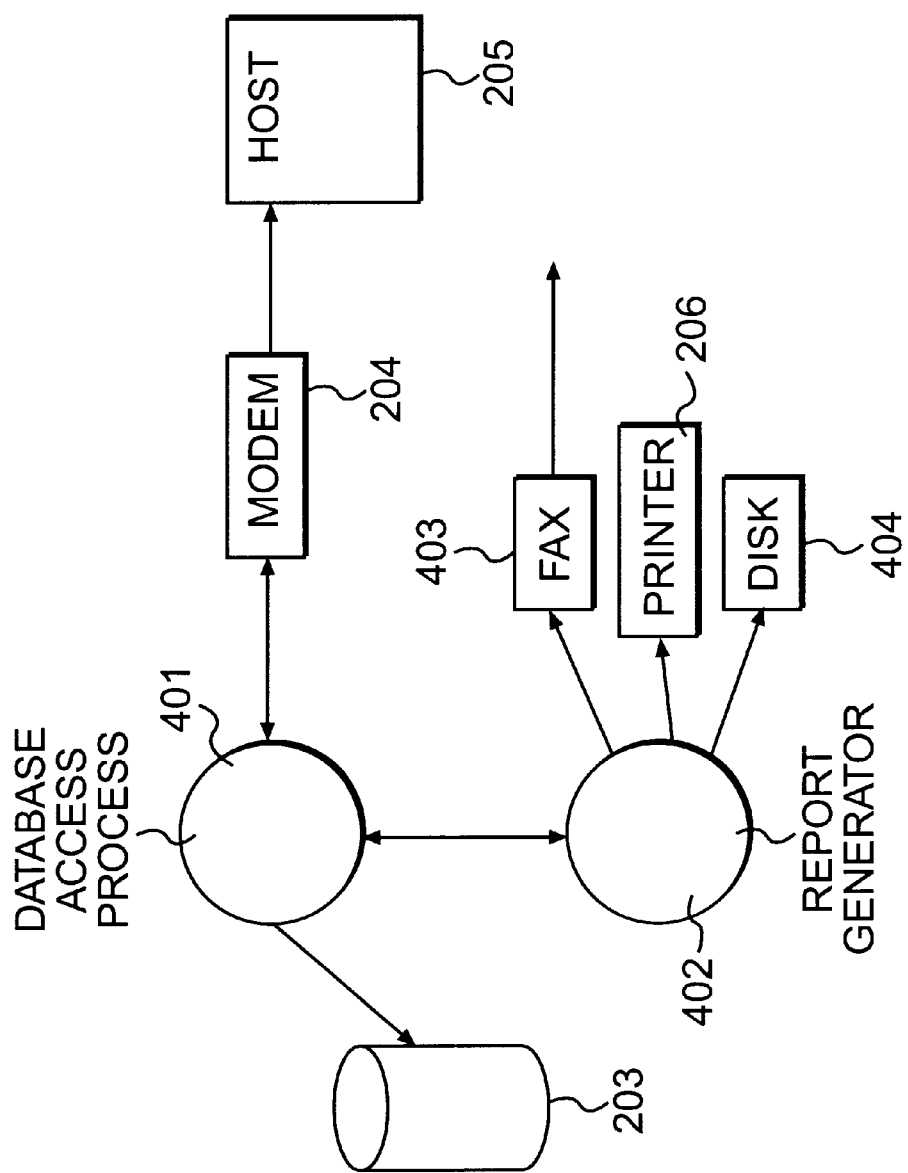
FIG. 4 is a block diagram of a system for using the information gathered in conjunction with the present invention.

After calls have been routed, the Caller IDs and other pertinent information are stored in a database on the PC or network (208 and 209). Referring to FIG. 4, this data is accessed "off-line" by a Data Access Process (DAP) (401) which collects matched information on these Caller ID numbers. Reports are generated by program (402). Final reports may be printed on a printer 206, faxed on a fax machine 206, sent as floppies 404, delivered electronically, or delivered to customers.

Figure 5:
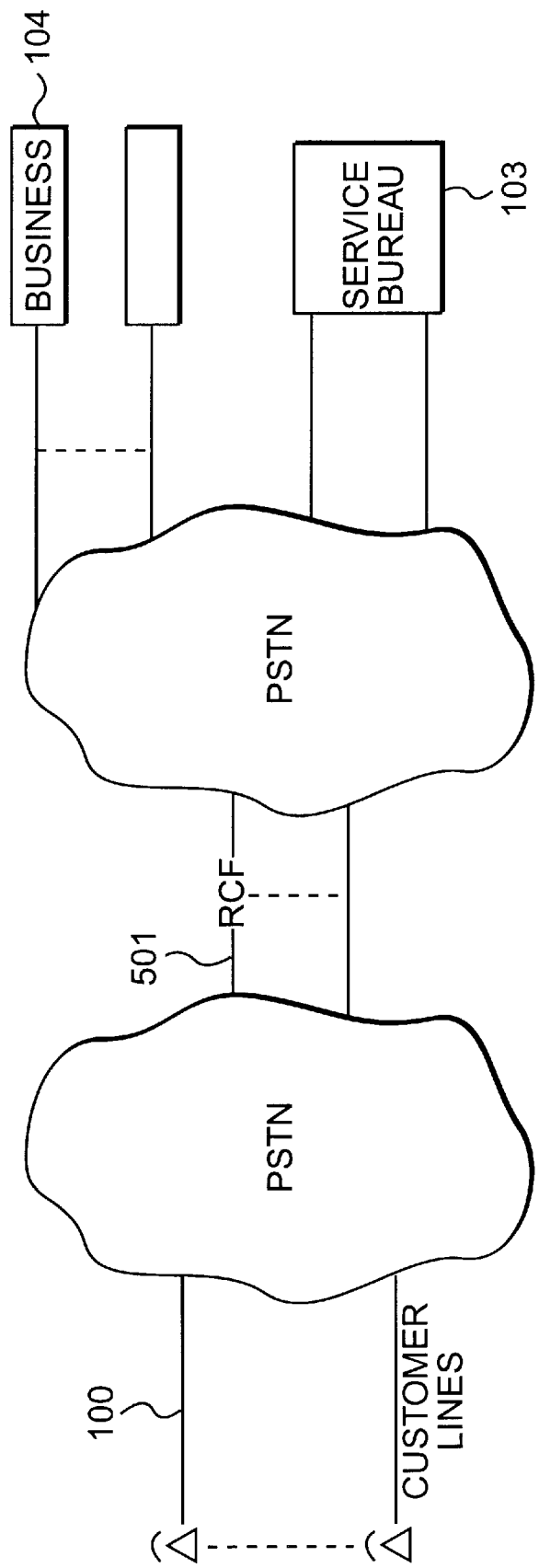
FIG. 5 is a block diagram showing an embodiment of the invention using remote call forwarding.

This method of Caller ID collection can be combined with Remote Call Forwarding (RCF) to provide call durations in reporting. Call durations are important to customers performing sales functions on the calls. Longer conversations are associated with sales for instance. Referring to FIG. 5, if an RCF number (501) is put in series with the service bureau the reported records on the RCF calls may be associated with the records of the Service Bureau to form a more complete picture of the call traffic. Time stamps on calls are used to make the association of caller records. The RCF numbers are associated with specific buttons on the ISDN BRI. This fixed relationship and the time stamps makes this additional reporting possible.

An example scenario is described as an aid in understanding the invention. In advance of putting the invention in service, arrangements are made with the local telephone service provider for ISDN BRI lines to the specifications of the service bureau. Features required for the operation of this invention are call transfer, call hold, Caller ID, at least one inbound and at least one outbound directory number (button). Other features such as call forward no answer, call forward all calls, call forward busy may be used by the service bureau to provide additional routing benefits to a customer. Call forward no answer, discussed above, may be used for fixed routing and Caller ID capture. Call forward all calls may be used to route around the service bureau in event of a failure. Call forward busy may be used to provide overflow routing to a customer's alternate call center. Referring to FIG. 3, the embodiment of the invention described uses a message passing process called a Router (303). All processes can send and receive messages to each other through the Router. When a process initializes (starts) it registers with the Router with a unique address or name. Names are known by convention by the various processes. Messages may then be sent between two processes by telling the router the address of the originating and terminating process. This type of interprocess communication method may use shared memory or other operating system service designed for such purpose. Design of such a router is well within the scope and skill of anyone skilled in the art so is not discussed in detail here.

An incoming call reaches the ISDN BRI port (201) as a sequence of Q.931 messages. The Q.931 protocol is described in detail by publications available from Bellcore. In an embodiment of the design, an AT&T 8510 phone passes "Hayes " type messages through an RS-232 port to a PC. The ICP (301) parses incoming messages looking for an ALERT message. The alert message tells the ICP there is a call to be answered. The button number of the call is passed as part of the ALERT message. The button number is passed in a ISDN_GET_LINE message to a Routing Responder (311). An additional process—DataBase Interface Process (DIP) (302)—stores the Caller ID together with the button number in a database (312) or directly to a file on the hard-disk. The DIP program is passed all messages handled by the Router so it may discriminate the key messages containing the Caller ID information. The routing responder takes the button number from the message and performs a lookup in a table for tables for special routing information. The result of this lookup is a directory number for the destination of the call. This directory number is passed back to the ICP in a ISDN_USE_LINE message.

Once the ICP receives the ISDN_USE_LINE the incoming call is put on hold by sending a ATH message to the phone (201). A second message, ATD, is then sent to place an outbound call on a reserved button for this directory number. This reserved number could be unique to each incoming directory group or could be a single number for the entire phone. The final message to the phone is at ATT which completes the transfer of the call. The sequence of messages and responses from the ISDN phone differs under various circumstances and from switching system to switching system. In general, each message is answered by a response from the network switch. The extended "Hayes" protocol is documented by AT&T in its manual for their series of ISDN BRI phones (AT&T 533-705-200).

Various error or network conditions such as busy or congestion are passed back in response messages. Handling of errors and network conditions also varies from switch to switch and possibly from customer to customer. In general, any error is handled by a retry of the hold, outgoing call, and transfer.

In one embodiment, calls entering the Service Bureau on a particular ISDN BRI port (201) while a transfer is in progress become queued for processing. The stack of queued calls is "popped" at the end of processing of the prior call. Calls in this queue are allowed to ring (not answered). Like any telephone call distribution method, traffic engineering concerns play a part in the workable load presentable on the system. The invention works best with evenly distributed traffic occurring at a rate less than the call handling time.

Figure 6:
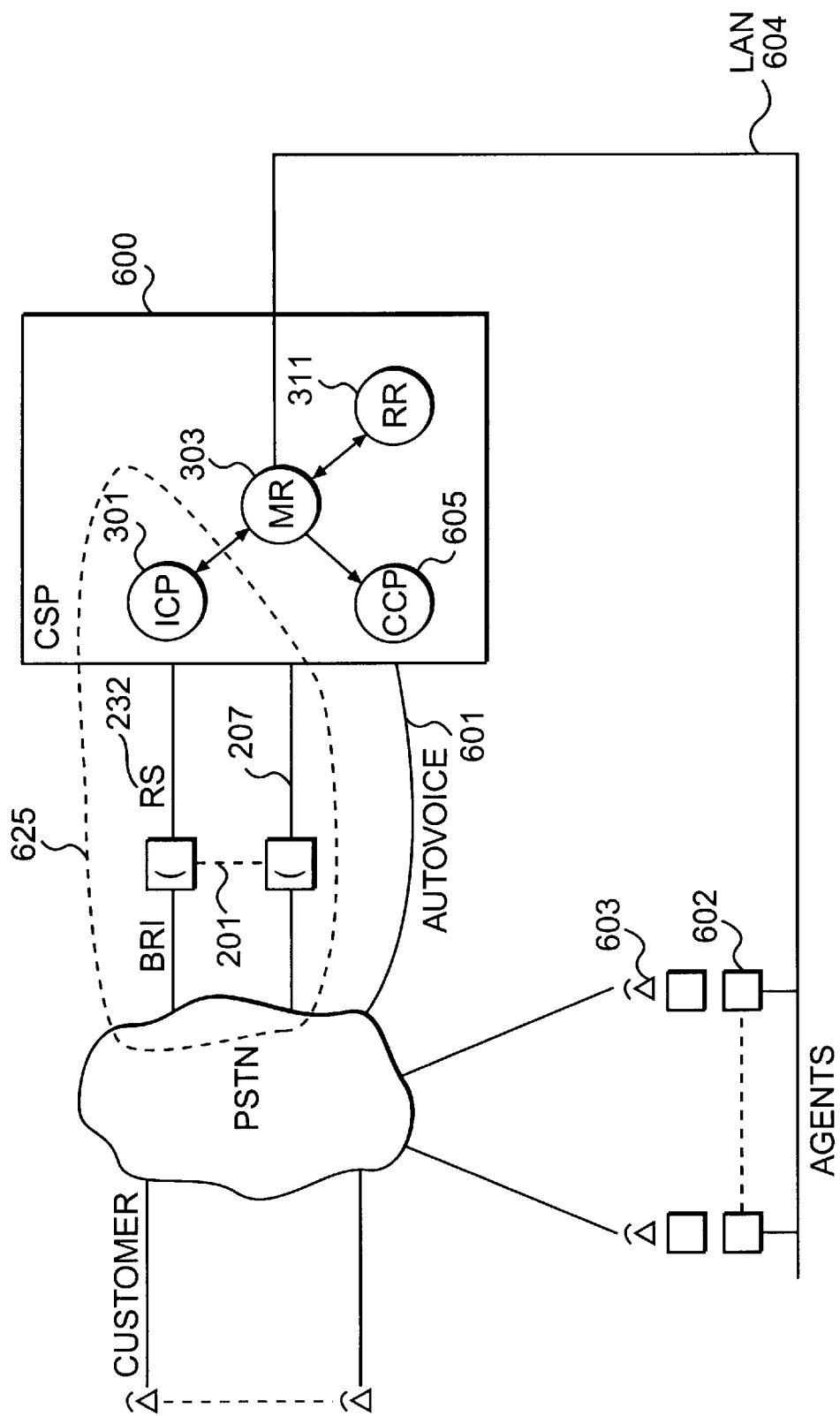
FIG. 6 is a block diagram of the present invention used in conjunction with a call distributor system.

FIG. 6 shows an example of the system of the current invention interworking with the call distributor of U.S. Pat. No. 5,557,668 to Brady which is hereby incorporated by reference in its entirety. FIG. 6 shows a LAN 604, a PSTN, agents and autovoice 601. The subsystem 600 interworks with the call distributor invention as follows. The subsystem answers calls at BRI 201, collects information from the phone, passes information to Call Control Processes (CCP) 605 through the router (idle CCP process allocated from the routing responder 311), and finally transfers call to analog phone lines which corresponds to the allocated CCP process. The call is answered and appropriate prompts/messages/etc. are started. Transferring to analog is not necessary as voice work may be done with ISDN. Also ISDN is not the only digital technology which can be used. Other CPE digital protcols may also be used with he present invention.

Appendix 1 is included to illustrate the method of operation of a working system. The source code in Appendix 1 collects Caller ID and button number for any call reaching an ISDN BRI port. The ISDN BRI port is configured for CFNA at no rings. This makes it unnecessary to actually answer and transfer the call. There are restrictions, obviously, on the flexibility of call handling in this method. For Caller ID capture this is a simple embodiment which works where customers have fixed call distribution needs. Appendix 2 illustrates an embodiment of the invention which utilizes a Routing Responder. Calls are answered and transferred to destinations returned from this process. Appendix 3 illustrates the source code used for a particular embodiment of the Routing Responder 311 (FIG. 3).

What is claimed is:

1. A service bureau for using caller identification data to process a telephone call made by a caller, comprising:
    a caller identification processing device to receive the caller identification data contained in the telephone call;
    a database containing destination telephone numbers corresponding to caller identification values;
    a database interface process to access the database using the caller identification data to extract a particular destination telephone number corresponding to the caller identification data;
    a call forwarding process to forward the telephone call to the destination telephone number;
    an information process to obtain additional information from the caller; and
    a storing process to store the additional information so that it can be retrieved using the caller identification data.

2. A service bureau for using caller identification data to process a telephone call made by a caller, comprising:
    a caller identification processing device to receive the caller identification data contained in the telephone call;
    a database containing destination telephone numbers corresponding to caller identification values;
    a database interface process to access the database using the caller identification data to extract a particular destination telephone number corresponding to the caller identification data;
    a call forwarding process to forward the telephone call to the destination telephone number; and
    a reporting process to generate a report regarding telephone call activity.

3. The service bureau recited in claim 2, wherein the reporting process reports duration of the telephone call.

4. A method for using caller identification data to process a telephone call made by a caller, comprising the steps of:
    receiving the caller identification data contained in the telephone call;
    using the caller identification data to access a database containing destination telephone numbers corresponding to caller identification values to extract a particular destination telephone number corresponding to the caller identification data;
    forwarding the telephone call to the destination telephone number;
    obtaining additional information from the caller; and
    storing the additional information so that is can be retrieved using the caller identification data.

5. A method for using caller identification data to process a telephone call made by a caller, comprising the steps of:
    receiving the caller identification data contained in the telephone call;
    using the caller identification data to access a database containing destination telephone numbers corresponding to caller identification values to extract a particular destination telephone number corresponding to the caller identification data;
    forwarding the telephone call to the destination telephone number; and
    generating a report regarding the telephone call activity.

6. The method recited in claim 5, further comprising the step of reporting a duration of the telephone call.

* * * * *